United States Patent
Frankel (10) Patent No.: US 9,266,192 B2
(45) Date of Patent: Feb. 23, 2016

(54) METHOD AND APPARATUS FOR PROCESSING WORKPIECES

(75) Inventor: Joseph G. Frankel, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 303 days.

(21) Appl. No.: 13/482,248

(22) Filed: May 29, 2012

(65) Prior Publication Data

US 2013/0319982 A1    Dec. 5, 2013

(51) Int. Cl.

| | |
|---|---|
| *B23K 26/00* | (2014.01) |
| *B23K 26/02* | (2014.01) |
| *B23K 26/10* | (2006.01) |
| *H01L 21/00* | (2006.01) |
| *B23K 26/03* | (2006.01) |
| *B23K 26/36* | (2014.01) |
| *B23K 26/06* | (2014.01) |

(52) U.S. Cl.
CPC ............ *B23K 26/032* (2013.01); *B23K 26/082* (2015.10); *B23K 26/36* (2013.01); *Y10T 279/21* (2015.01)

(58) Field of Classification Search
CPC .. B23K 26/00; B23K 26/032; B23K 26/0807; B23K 26/36; B23K 26/043; B23K 26/045; B23K 26/046; B23K 26/367; B23K 26/38; Y10T 279/21
USPC ............... 219/121.72, 121.74, 121.8, 121.75, 219/121.78, 121.79; 279/126; 438/7, 462, 438/463
See application file for complete search history.

(56) References Cited

U.S. PATENT DOCUMENTS

| | | |
|---|---|---|
| 6,066,562 A | 5/2000 | Ohshima et al. |
| 6,271,102 B1 | 8/2001 | Brouillette et al. |
| 6,441,504 B1 | 8/2002 | Glenn et al. |
| 6,465,158 B1 | 10/2002 | Sekiya |
| 6,676,878 B2 | 1/2004 | O'Brien et al. |
| 6,998,571 B2 | 2/2006 | Sekiya et al. |
| 7,157,038 B2 | 1/2007 | Baird et al. |
| 7,183,589 B2 | 2/2007 | Kameyama et al. |

(Continued)

FOREIGN PATENT DOCUMENTS

| | | |
|---|---|---|
| CN | 101518855 A | 9/2009 |
| CN | 201628537 U | 11/2010 |

(Continued)

OTHER PUBLICATIONS

International Search Report of PCT/US2013/035650, 2 pages.

(Continued)

*Primary Examiner* — Tu B Hoang
*Assistant Examiner* — Michael Hoang (57) ABSTRACT

An apparatus for processing a workpiece can be exemplarily characterized as including a processing tool having a processing region within which a workpiece can be processed, and an illumination system configured to direct detection light into the processing region. In this embodiment, detection light directable by the illumination system has a wavelength to which the workpiece is at least partially opaque. The apparatus may further include an image sensor configured to detect a characteristic of the detection light transmitted through the processing region and a chuck configured to support a workpiece such that at least a portion of the workpiece is disposable within the processing region and is illuminatable by the detection light. Methods for processing a workpiece are also disclosed.

22 Claims, 3 Drawing Sheets

(56) References Cited

U.S. PATENT DOCUMENTS

| | | |
|---|---|---|
| 7,244,938 B2 | 7/2007 | Nagai |
| 7,494,900 B2 | 2/2009 | Harris et al. |
| 7,566,635 B2 | 7/2009 | Fujii et al. |
| 7,655,541 B2 | 2/2010 | Oba |
| 7,687,373 B2 | 3/2010 | Sekiya |
| 7,776,720 B2 | 8/2010 | Boyle et al. |
| 7,915,140 B2 | 3/2011 | Genda et al. |
| 7,947,575 B2 | 5/2011 | Dunne et al. |
| 8,053,279 B2 | 11/2011 | Farnworth et al. |
| 8,071,429 B1 | 12/2011 | Qian et al. |
| RE43,400 E | 5/2012 | O'Brien et al. |
| 8,350,383 B2 | 1/2013 | Daubenspeck et al. |
| 8,735,772 B2 | 5/2014 | Chacin et al. |
| 8,753,959 B2 | 6/2014 | Yun et al. |
| 8,791,033 B2 | 7/2014 | Gasa et al. |
| 2001/0032533 A1* | 10/2001 | Sekiya ............................ 83/452 |
| 2002/0033558 A1 | 3/2002 | Fahey et al. |
| 2002/0146155 A1* | 10/2002 | Mil'shtein et al. ............ 382/115 |
| 2005/0054179 A1 | 3/2005 | Nagai |
| 2005/0260829 A1 | 11/2005 | Uematsu et al. |
| 2006/0154385 A1 | 7/2006 | Aggarwal |
| 2006/0261050 A1* | 11/2006 | Krishnan et al. ......... 219/121.74 |
| 2007/0035727 A1 | 2/2007 | Chen et al. |
| 2007/0275541 A1* | 11/2007 | Harris et al. ................. 438/460 |
| 2008/0055588 A1 | 3/2008 | Nomaru et al. |
| 2008/0137099 A1 | 6/2008 | Hugers |
| 2009/0067679 A1* | 3/2009 | Mainguet ...................... 382/115 |
| 2009/0236324 A1* | 9/2009 | Fukuyo et al. ............ 219/121.72 |
| 2009/0321397 A1 | 12/2009 | Krishnaswami et al. |
| 2010/0106447 A1* | 4/2010 | Yamada ....................... 702/117 |
| 2011/0132885 A1 | 6/2011 | Sercel et al. |
| 2013/0082448 A1 | 4/2013 | Ferguson |
| 2013/0095586 A1 | 4/2013 | Kim et al. |

FOREIGN PATENT DOCUMENTS

| | | |
|---|---|---|
| DE | 10005592 C1 | 10/2001 |
| KR | 10-2009-0000871 A | 1/2009 |
| KR | 899391 B1 | 5/2009 |
| WO | WO 2009/047990 A1 | 4/2009 |
| WO | WO 2009/126910 A2 | 10/2009 |

OTHER PUBLICATIONS

Written Opinion of PCT/US2013/035650, 3 pages.
R.S. Aikens, et al. "Solid-State Imagers for Microscopy" Method in Cell Biology, vol. 29, 1989, 23 pages.
English translation of the Sep. 25, 2015 Office action concerning Chinese Patent Application No. 2015092200623900, 14 pages.

\* cited by examiner

METHOD AND APPARATUS FOR PROCESSING WORKPIECES

BACKGROUND

Embodiments of the present invention exemplarily described herein relate generally to methods and apparatuses for processing workpieces. More particularly, embodiments of the present invention exemplarily described herein relate to methods and apparatuses for processing workpieces in which light is directed onto one side of a processed workpiece and the light is detected on another side of the workpiece.

Within the semiconductor industry, substrate dicing is a critical aspect of package assembly that facilitates all subsequent operations in an assembly process. Dicing is conventionally performed using a mechanical saw. The thickness of the semiconductor substrates (typically formed of silicon) can be reduced to enable through-silicon via (TSVs), stacked memory, interposer, micro electro-mechanical (MEM), and system-in-package (SIP) technologies. However when reduced in thickness to below about 50 μm, the substrate becomes increasingly flexible, fragile and difficult to dice by traditional mechanical dicing techniques. Laser-based dicing techniques, which use laser light to remove substrate material by ablation, have been developed to address shortcomings of traditional mechanical dicing. Nevertheless, it can be difficult ensure that the right amount of material is removed to dice the substrate. If too much laser energy is applied to an area of the substrate, the laser may damage supporting structures such as a die-attach-film (DAF), a chuck, and the like. If too little laser energy is applied, the substrate will not be diced.

SUMMARY

One embodiment exemplarily described herein can be characterized as an apparatus for processing a workpiece, wherein the apparatus includes a processing tool having a processing region within which a workpiece can be processed, and an illumination system configured to direct detection light into the processing region. In this embodiment, detection light directable by the illumination system has a wavelength to which the workpiece is at least partially opaque. The apparatus may further include an image sensor configured to detect a characteristic of the detection light transmitted through the processing region and a chuck configured to support a workpiece such that at least a portion of the workpiece is disposable within the processing region and is illuminatable by the detection light.

Another embodiment exemplarily described herein can be characterized as a method of processing a workpiece, wherein the method includes arranging a workpiece such that a portion of the workpiece is disposed within a processing region of a processing tool and, within the processing region, processing the workpiece with the processing tool. Detection light can be directed into the processing region and onto the portion of the workpiece. In this embodiment, the detection light can have a wavelength to which the workpiece is at least partially opaque. After the processing, a characteristic of the detection light transmitted through the processing region can be detected.

DETAILED DESCRIPTION OF THE ILLUSTRATED EMBODIMENTS

Exemplary embodiments of the present invention will be described more fully hereinafter with reference to the accompanying drawings. It will be appreciated that these embodiments may be altered and implemented in many different forms and should not be construed as limited to the discussion set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As exemplarily described herein, an apparatus for processing a workpiece (i.e., a workpiece processing apparatus) includes a processing tool configured to process (e.g., cut, etch, grind, heat, ablate, melt, vaporize, shape, etc.) a workpiece disposed within a processing region thereof. Workpieces that can be processed by the workpiece processing apparatus include substrates such as silicon (Si) wafers, silicon-on-insulator (SOI) wafers, gallium arsenide (GaAs) wafers, sapphire wafers, etc., printed circuit boards (PCBs), flexible printed circuits (FPCs), ceramic pieces, metal pieces (e.g., plates, foils, etc.), polymers, phase change materials (e.g., chalcogenide-based phase change materials such as GeSbTe, AgInSbTe, GaSb, InSb, InSbTe, (GeSn)SbTe, InSe, GaSeTe, GeSb(SeTe), SbTe, SnSbTe, TeGeSbS, GeTe, InSbGe or the like or a combination thereof). The processing tool can process a workpiece to form one or more features (e.g., vias, holes, bores, slots, scribe lines, fiducial markers, etc.) that extend fully or partially through a workpiece. Exemplary processing tools that may be incorporated within the workpiece processing apparatus include mechanical drills, mechanical saws, plasma etchers, chemical etchers, laser systems, or the like or a combination thereof.

The workpiece processing apparatus also includes a detection system configured to determine a processing state of the workpiece. For example, the detection system can be configured to determine whether or not a feature has been desirably formed as a result of the workpiece being processed by the processing tool. In some embodiments, the detection system can control an operation of the processing tool based on the determined processing state. For example, if it is determined that a feature has not been formed as desired, the detection system can control an operation of the processing tool to re-process the workpiece until the feature is formed as desired. Thus the detection system can function as a closed-loop controller, allowing the workpiece to be iteratively processed by the processing tool until a feature is formed as desired. By processing a workpiece with the workpiece processing apparatus exemplarily described above, formation of features can be easily and dynamically regulated with a closed-loop feedback mechanism rather than by setting the number of process iterations before processing the workpiece.

In some embodiments, the detection system can include an illumination system, an image sensor and a controller. The illumination system can be configured to direct detection light into the processing region of the processing tool so that a portion of the workpiece disposed within the processing region is illuminated by the detection light. The image sensor can be configured to detect an image of the detection light transmitted though the processing region and generate an image signal corresponding to the detected image. The controller is coupled to the image sensor and is configured to determine the processing state of the workpiece based on the image signal.

Generally, the workpiece to be processed will be at least partially opaque to the detection light. Thus when the workpiece is disposed within the processing region of the processing tool, at least a portion of the detection light directed into the processing region is prevented from being transmitted through processing region by the workpiece. However upon processing the workpiece with the processing tool, regions of the workpiece (e.g., extending through the thickness of the workpiece) may be thinned or removed entirely. As a result, detection light which was prevented from being transmitted through the processing region by the workpiece before the workpiece was processed can potentially be transmitted through the processing region due to formation of the thinned or removed regions of the processed workpiece. The image sensor can thus detect an image of any detection light transmitted through the processing region when the workpiece is still in the processing region, and the controller can determine the processing state of the workpiece based on the image signal generated by the image sensor. Because the processing state of the workpiece can be determined without having to move the processed portion of the workpiece outside the processing region, the processing state of any portion of the workpiece within the processing region can be quickly and repeatedly determined without undesirably slowing through-put of the workpiece processing.

An example embodiment of the aforementioned methods and apparatus for processing workpieces will now be described with respect to FIGS. 1 to 7. In this example embodiment, a workpiece is intended to be processed using a laser system as a processing tool to form features such as scribe lines which extend fully through the workpiece. It will be appreciated, however, that the methods and apparatus described herein can be applied to form other features such as vias, holes, bores, slots, fiducial markers, etc. that extend fully or partially through a workpiece, or even scribe lines that extend partially through a workpiece. It will also be appreciated that the methods and apparatus described herein can be used with processing tools other than laser systems (e.g., mechanical drills, mechanical saws, plasma etchers, etc.).

Figure 1:
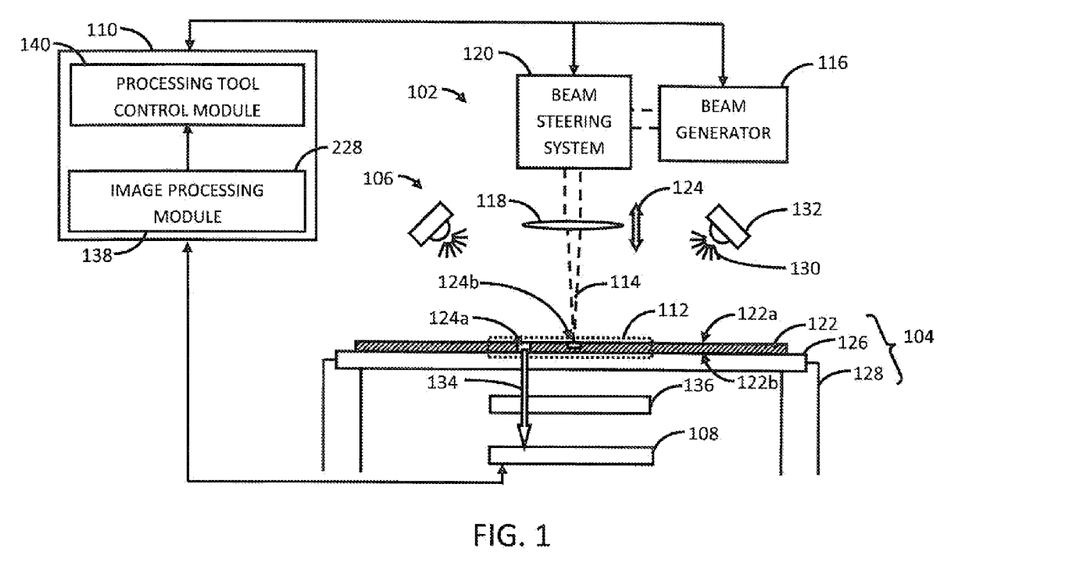
FIG. 1 schematically illustrates a workpiece processing apparatus according to one embodiment of the present invention.

Referring to FIG. 1, a workpiece processing apparatus, such as workpiece processing apparatus 100, may, for example, include a processing tool such as a laser system 102. The workpiece processing apparatus 100 may also include a wafer support system 104 as well as a detection system that includes an illumination system 106, an image sensor 108 and a controller 110.

As exemplarily illustrated, a processing region of the laser system 102 is delineated by box 112. The laser system 102 is generally configured to direct a beam of laser energy 114 into the processing region 112. In one embodiment, the laser system 102 includes a beam generator 116, a scan lens 118 and a beam steering system 120. The beam generator 116 is configured to generate a beam of laser energy (e.g., in the form of a series of laser pulses) 114 having one or more beam parameters such as wavelength, power, pulse rate, pulse duration, etc. In one embodiment, the beam of laser energy 114 may have a wavelength generally corresponding to ultraviolet (UV) light, green light, infrared (IR) light, or the like or a combination thereof. The scan lens 118 is configured to focus the beam of laser energy 114 such that, when directed onto a portion of the workpiece (e.g., workpiece 122) disposed within the processing region 112, the beam of laser energy 114 has one or more parameters such as spot size and fluence at the surface of the workpiece 122. In some embodiments, a lens driving assembly (not shown) may be used to move the scan lens 118 in a z-axis direction (e.g., along directions indicated by arrow 124) to change the spot size and/or fluence of the beam of laser energy 114 at the surface of the workpiece 122. The beam steering system 120 is configured to laterally scan the beam of laser energy 114 relative to the workpiece 122 within a two-dimensional field (e.g., an X-Y field). Accordingly, the beam steering system 120 can include one or more galvanometric mirrors or "galvo-mirros" (e.g., a X-axis galvo-mirror and/or a Y-axis galvo-mirror), one or more fast-steering mirrors (FSMs), one or more piezo-actuated mirrors, one or more acousto-optic deflectors (AODs), one or more electro-optic deflectors (EODs), or the like or a combination thereof.

Figure 2:
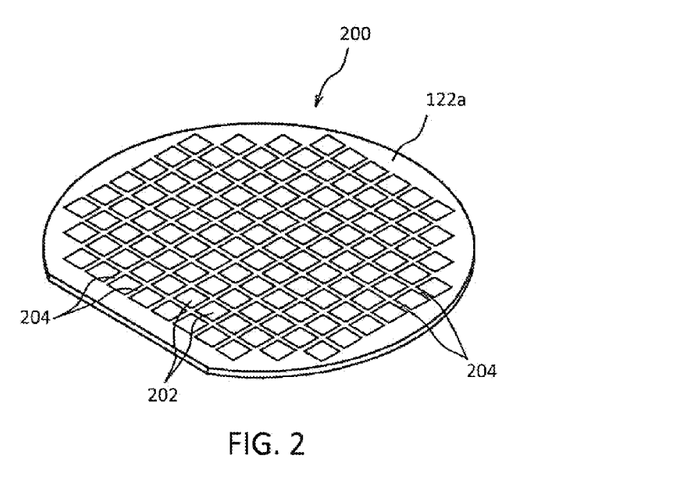
FIG. 2 is a perspective view schematically illustrating one embodiment of a workpiece that may be processed by the workpiece processing apparatus shown in FIG. 1.
Figure 3:
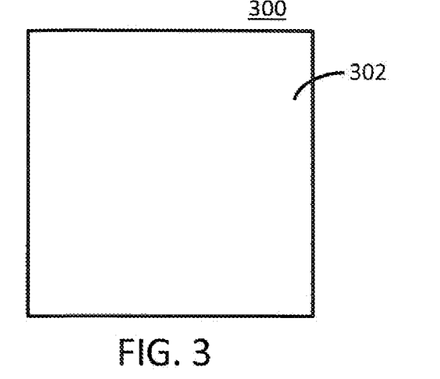
FIGS. 3-5 schematically illustrate exemplary images of detection light detected by the image sensor shown in FIG. 1 at various processing stages of workpiece processing.

Referring to FIGS. 1 and 2, the workpiece 122 may be provided as a semiconductor (e.g., silicon) wafer 200 having a plurality of active regions 202 where integrated circuits (ICs), semiconductor memory, MEM devices, etc., are formed on a front side 122a (also referred to herein as a "first side") of the semiconductor wafer 200. Active regions 202 are separated from each other by streets 204 that form a lattice pattern on the front side 122a of the semiconductor wafer 200. The thickness of the semiconductor wafer, as measured between the front side 122a and a back side 122b can be less than 100 µm. In one embodiment, the thickness of the semiconductor wafer 200 can be less than 50 µm. The width of a street 204 may be in a range from about 20 µm to about 30 µm. Optionally, the semiconductor wafer 200 may be temporarily adhered to a DAF (not shown) to facilitate transport of the semiconductor wafer 200 into and out of the workpiece processing apparatus 100.

Referring back to FIG. 1, the aforementioned components of the laser system 102 can be cooperatively controlled to direct a beam of laser energy 114 onto any portion of the workpiece 122 that is disposed within the processing region 112 to process the workpiece 122. As exemplarily illustrated, laser system 102 has processed the workpiece 122 to remove material from the workpiece 122 and form features 124a and 124b, which are intended to be scribe lines formed within streets 204 shown in FIG. 2). It will be appreciated that any combination of the aforementioned components of the laser system 102 can be cooperatively controlled so as to laterally scan the beam of laser energy 114 within the processing region 112 and relative to the workpiece 122 to form desired features such as scribe lines, through vias, slots, or the like or a combination thereof. In one embodiment, any combination of the aforementioned components of the laser system 102 can be cooperatively controlled to direct the beam of laser energy 114 onto the workpiece 122 in the manner described in U.S. Pat. No. 7,947,575, which is incorporated by reference in its entirety.

The workpiece support system 104 is configured to support the workpiece 122 such that at least a portion of the workpiece 122 is disposed within the processing region 112. In the illustrated embodiment, the workpiece support system 104 includes a chuck 126 and a chuck support 128. The chuck 126 is generally configured to support the workpiece 122 such that the workpiece 122 does not undesirably move during processing. Accordingly, the chuck 126 may be provided as a vacuum-chuck, an electro-static discharge chuck, or the like or a combination thereof. As illustrated, the chuck 126 extends continuously beneath an entirety of a back side 122b (also referred to herein as a "second side") of the workpiece 122. In other embodiments, however, the chuck 126 may be configured to extend beneath less than the entirety of the back side 122a. For example, depending on the size, shape and/or stiffness of the workpiece 122, the chuck 126 may be configured to contact a periphery of the back side 122a. The chuck support 128 is coupled to the chuck 126 and is configured to suspend the chuck 126 above the image sensor 108. The chuck support 128 may also be moveable relative to the processing region 112 and be coupled to one or more motion control stages (e.g., X-, Y- and/or θ-motion control stages, not shown) operative to effect such movement. In one embodiment, operation of the one or more motion control stages may be controlled by the controller 110 or another control system.

Constructed as described above, the workpiece support system 104 can support and move different portions of the workpiece 122 into and out of the processing region 112. Accordingly, after all desired features have been formed in one portion (e.g., a first portion) of the workpiece 122 disposed within the processing region 112, the workpiece support system 104 can move the workpiece 122 relative to the processing region 112 such that desired features can be formed in another portion (e.g., a second portion) of the workpiece 122.

The illumination system 106 is configured to direct detection light 130 into and through the processing region 112. In the illustrated embodiment, the illumination system 106 includes one or more light-emitting devices 132 operative to emit the detection light 130. In one embodiment, operation of one or more of the light-emitted devices 132 may be controlled by the controller 110 or another control system. As exemplarily illustrated, the light-emitting devices 132 are disposed above the workpiece 122 so that the detection light 130 can be directed into the processing region 112 in the same general direction in which the beam of laser energy 114 is directed into the processing region 112. Thus when a portion of the workpiece 122 is disposed within the processing region 112, a front side 122a of the portion of the workpiece 122 disposed in the process region 112 can be illuminated by the detection light 130. The detection light 130 can have a wavelength that is different from wavelength in the beam of laser energy 114. For example, the detection light 130 can have a wavelength corresponding to red light, yellow light, blue light, green light, UV light, IR light, etc., if the wavelength of the detection light 130 is different from that of beam of laser energy 114.

The light-emitting devices 132 are configured such that the emitted detection light 130 is at least partially prevented from being transmitted through the processing region 112 by the workpiece 122. Thus the configuration of the light-emitting devices 132 may depend upon the workpiece 122 being processed so that the workpiece 122 will be at least partially opaque to the emitted detection light 130. For example, if the workpiece 122 is, provided as a silicon wafer, one or more of the light-emitting devices 132 can be configured to emit detection light 130 having a wavelength in the visible or ultraviolet wavelength range (e.g., below about 760 nm). However if the workpiece 122 is provided as a glass substrate, one or more of the light-emitting devices 132 can be configured to emit detection light 130 having a wavelength in the long-wavelength or far infrared wavelength range (e.g., above about 8 μm). It will be appreciated that one or more of the light-emitting devices 132 can be provided as a light-emitting diode (LED), an organic light-emitting device (OLED), arc lamp, a gas discharge lamp, an induction lamp, or the like or a combination thereof. In an embodiment where, as illustrated, the chuck 126 extends continuously beneath the entirety of the back side 122a of the workpiece 122, the light-emitting devices 132 are further configured such that the emitted detection light 130 is at least partially transmittable through the chuck 126. In one embodiment, the chuck 126 can be less opaque to the detection light 130 than the workpiece 122.

Constructed as described above, the illumination system 106 directs detection light 130 onto the workpiece 122 such that the front side 122b of the portion of the workpiece 122 within the processing region 112 can be illuminated with the detection light 130. In this example embodiment, feature 124a extends fully through the workpiece 122 whereas feature 124b extends only partially through the workpiece 122. Consequently, detection light 130 directed by the illumination system 106 can be transmitted through the processing region 112 to the image sensor 108 by way of feature 124a (e.g., as indicated by arrow 134). However because feature 124b extends only partially through the workpiece 122, detection light 130 is blocked from reaching the image sensor 108 by way of feature 124b.

The image sensor 108 is configured to detect a characteristic (e.g., an image) of the detection light 130 transmitted through the processing region 112. The image sensor 108 may be further configured to generate an image signal corresponding to the detected image. In one embodiment, the image sensor 108 can be provided as one or more charge-coupled device (CCD) sensors, one or more CMOS sensors, or the like or a combination thereof. As exemplarily illustrated, the image sensor 108 is disposed below the processing region 112 and, thus, below the workpiece 122. It will be appreciated however, that the image sensor 108 may be disposed anywhere relative to the processing region 112 if some redirection mechanism (e.g., one or more reflective surfaces, one or more optical fibers, or the like or a combination thereof) is provided to optically couple the image sensor 108 to detection light 130 that has been transmitted through the processing region 112.

In one embodiment, an optical filter such as optical filter 136 is disposed between the image sensor 108 and the processing region 112. The optical filter 136 can be configured to selectively (or preferentially) transmit detection light 130 relative to light within the beam of laser energy 114. For example, the optical filter 136 may selectively transmit a selected wavelength of the detection light 130 to which the image sensor 108 is desirably sensitive and may substantially block (e.g., scatter, reflect, absorb, etc.) light from the beam of laser energy 114 from reaching the image sensor 108. Examples of suitable optical filters can include longpass filters, bandpass filters, shortpass filters, or the like or a combination thereof.

Constructed as described above, the image sensor 108 detects an image of detection light 130 transmitted through the processing region 112 and generates an image signal corresponding to the detected image. For example and with reference to FIG. 3, after the workpiece 122 is disposed in the processing region 112, but before the workpiece 122 is processed to form the features as desired (i.e., in this example embodiment, scribe lines which extend fully through the workpiece 122), all of the detection light 130 directed onto the first side 122a of the workpiece 122 is prevented from being transmitted through the processing region 112 onto the image sensor 108. Accordingly, an image detected by the image sensor 108 at this stage of workpiece processing could look like image 300, which shows a uniform, non-illuminated or "dark" region 302.

Figure 4:
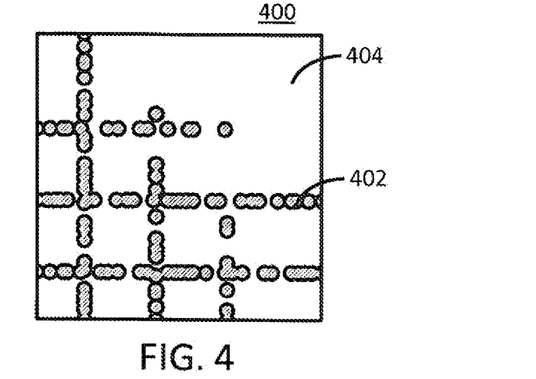

Referring to FIG. 4, after workpiece processing progresses further, but still before the features are formed as desired, some of the detection light 130 directed onto the first side 122a of the workpiece 122 is transmitted through the processing region 112 onto the image sensor 108. Accordingly, an image detected by the image sensor 108 at this stage of workpiece processing could look like image 400, which shows a pattern of illuminated regions 402 and non-illuminated regions 404. In the illustrated embodiment, the illuminated regions 402 correspond to regions of the workpiece 122 that have been removed entirely to form features such as feature 124a shown in FIG. 1. The non-illuminated regions 404 correspond to regions of the workpiece 122 that either have not been processed or that have been processed to form features such as feature 124b shown in FIG. 1.

Figure 5:
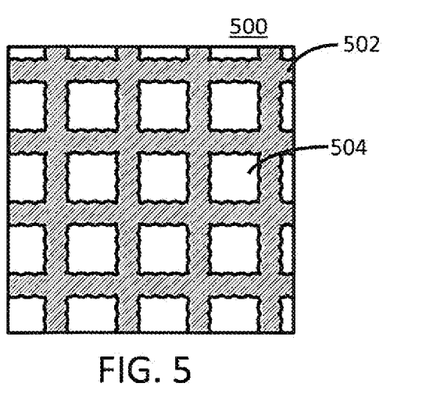

Referring to FIG. 5, after workpiece processing progresses still further, more of the detection light 130 directed onto the first side 122a of the workpiece 122 is transmitted through the processing region 112 onto the image sensor 108. Accordingly, an image of detection light 130 detected by the image sensor 108 at this stage of workpiece processing could look like image 500, which shows a pattern of illuminated regions 502 and non-illuminated regions 504. In the illustrated embodiment, the illuminated regions 502 correspond to regions of the workpiece 122 that have been removed entirely to form features similar to feature 124a shown in FIG. 1. The non-illuminated regions 504 may correspond to unprocessed regions of the workpiece 122. Thus, the location of illuminated regions 502 in the image 500 may correspond to the location of streets 204 on the semiconductor wafer 200 shown in FIG. 2. Similarly, the location of non-illuminated regions 504 in the image 500 may correspond to the locations of active regions 202 on the semiconductor wafer 200 shown in FIG. 2.

Referring back to FIG. 1, the controller 110 is coupled to the image sensor 108 and is configured to determine a processing state of the workpiece 122. For example, the controller 110 can include an image processing module 138 configured to determine the processing state of the workpiece 122 based on the image signal generated by the image sensor 108. In one embodiment, the image processing module 138 determines the processing state of the workpiece 122 by receiving an image signal generated by the image sensor 108 and processing the received image signal. In one embodiment, the received image signal can be processed by comparing the image described by the received image signal (i.e., a received "sample image") with a reference image to, for example, determine whether the received sample image sufficiently matches the reference image. Whether or not the received sample image sufficiently matches the reference image can be used in determining the processing state of the workpiece 122. It will be appreciated that any suitable computer-based image processing algorithm can be use to determine whether or not a received sample image sufficiently matches a reference image within a reasonable amount of time (e.g., within about 50 ms).

Figure 6:
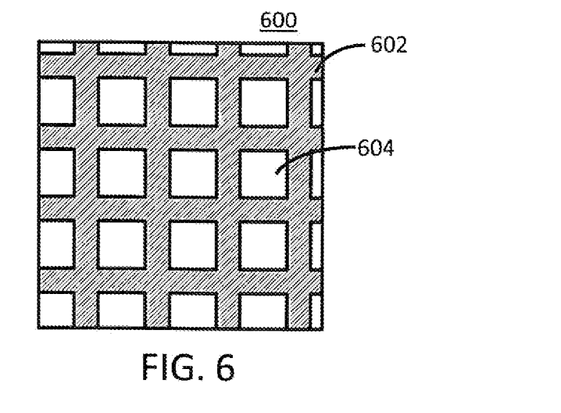
FIG. 6 schematically illustrates a reference image that may be used in determining a processing state of a workpiece, according to an embodiment of the present invention.

For example, the image processing module 138 may receive a sample image such as image 300, 400 or 500 and compare the received sample image with a reference image such as reference image 600 shown in FIG. 6. As shown in FIG. 6, the reference image 600 can include target illuminatable regions 602 and target non-illuminatable regions 604. In the illustrated embodiment, the target illuminatable regions 602 correspond to regions of the workpiece 122 that should be removed if the workpiece 122 is processed to form features as desired. Similarly, the target non-illuminatable regions 604 correspond to regions of the workpiece 122 that should be not be removed if the workpiece 122 is processed to form features as desired. Thus, the location of target illuminatable regions 602 in the reference image 600 may correspond to the location of streets 204 on the semiconductor wafer 200 shown in FIG. 2. Similarly, the location of target non-illuminatable regions 604 in the reference image 600 may correspond to the location of active regions 202 on the semiconductor wafer 200 shown in FIG. 2.

In one embodiment, the image processing module 138 may compare a received sample image with the reference image 600 to determine whether illuminated regions in the images are sufficiently coincident (e.g., overlap by at least 80%) with corresponding target illuminatable regions 602 in the reference image 600. For example, if image 400 is the sample image, the image processing module 138 may compare the images 400 and 600 and determine that the illuminated regions 402 in the sample image 400 are not sufficiently coincident with corresponding target illuminatable regions 602 in the reference image 600. Consequently, the image processing module 138 may determine that the processing state of the workpiece 122 is incomplete. However, if image 500 is the sample image, the image processing module 138 may compare the images 500 and 600 and determine that the illuminated regions 502 in the sample image 500 are sufficiently coincident with corresponding target illuminatable regions 602 in the reference image 600. Consequently, the image processing module 138 may determine that the processing state of the workpiece 122 is complete. The image processing module 138 may generate a processing state signal corresponding to the determined processing state of the workpiece 122.

Referring back to FIG. 1, the controller 110 may also be coupled to the laser system 102 and be configured to control an operation of the laser system 102. In this example embodiment, the controller 110 can include a processing tool control module 140 configured to control an operation of the laser system 102 by controlling the beam generator 116 to generate a beam of laser energy having the aforementioned beam parameters, and also by controlling the beam steering system 120 to laterally scan the beam of laser energy 114 relative to the workpiece 122 along a scan route on the workpiece 122 to form the scribe lines extending fully through the workpiece 122. An exemplary process controlling the laser system 102 to form features (e.g., scribe lines extending fully through the workpiece 122) will be discussed in greater detail below with respect to FIG. 7.

Figure 7:
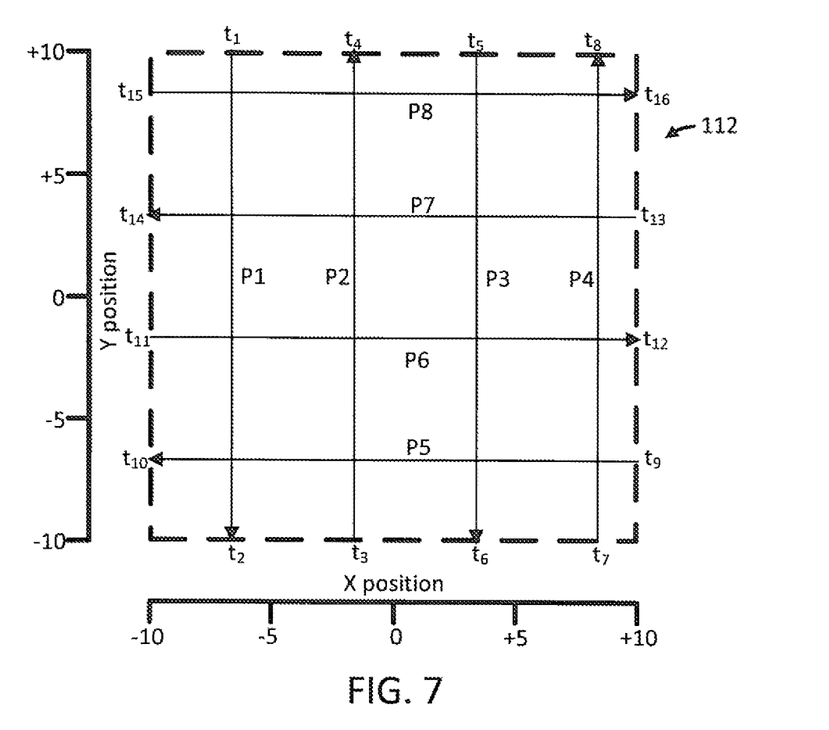
FIG. 7 schematically illustrates an exemplary route for scanning a beam of laser energy to process a workpiece, according to an embodiment of the present invention.

FIG. 7 illustrates the portion of the workpiece 122 disposed in the processing region 112 of the laser system 102 and identifies an exemplary route for scanning the beam of laser energy 114 to process the workpiece 122 and form scribe lines extending fully through the workpiece 122. In this example embodiment, the exemplary route includes a plurality of "sub-routes" labeled P1, P2, P3, P4, P5, P6, P7 and P8. It will be appreciated that the route may be formed of more or fewer sub-routes, and that the sub-routes may be straight (as illustrated), curved, or any combination thereof. In this example embodiment, the units for the X and Y positions are millimeters, but can be centimeters or micrometers depending upon the particular features that are to be formed during processing of the workpiece 122.

Referring to FIG. 7, at time $t=t_1$, the controller 110 (e.g., the processing tool control module 140) controls the beam steering system 120 so that, when the beam generator 116 is actuated to generate the beam of laser energy 114, the beam of laser energy 114 will impinge the workpiece 122 at the tail of arrow P1 (i.e., the beginning of the first sub-route P1). The controller 110 then controls the beam generator 116 and the beam steering system 120 to generate and scan the beam of laser energy 114 along the direction indicated by arrow P1 (i.e., along first sub-route P1) such that the beam of laser energy 114 arrives at the head of arrow P1 (i.e., the end of the first sub-route P1) at time $t=t_2$. Next, the controller 110 controls the beam generator 116 to stop generating the beam of laser energy 114 and controls the beam steering system 120 such that, when the beam generator 116 is actuated to generate the beam of laser energy 114 at time $t=t_3$, the beam of laser energy 114 will impinge the workpiece 122 at the tail of arrow P2 (i.e., the beginning of the second sub-route P2). The controller 110 then controls the beam generator 116 and the beam steering system 120 to generate and scan the beam of laser energy 114 along the direction indicated by arrow P2 (i.e., along second sub-route P2) such that the beam of laser energy 114 arrives at the head of arrow P2 (i.e., the end of the second sub-route P2) at time $t=t_4$. This process is then repeated so that the beam of laser energy 114 is sequentially scanned along third, fourth, fifth, sixth, seventh and eighth sub-routes P3, P4, P5, P6, P7 and P8.

Referring back to FIG. 1, the processing tool control module 140 can be configured to control an operation of the laser system 102 based on the processing state of the workpiece 122, as determined by the image processing module 138. In one embodiment, the processing tool control module 140 can control the operation of the laser system 102 based on the processing state signal generated by the image processing module 138. For example, after workpiece 122 is initially processed along the entire route illustrated in FIG. 7 (i.e., after time $t=t_{16}$), the controller 110 can send an image capture trigger signal to the image sensor 108. Upon receiving the image capture trigger signal, the image sensor 108 detects an image of detection light 130 transmitted through the processing region 112 and send a sample image to the image processing module 138. The image processing module 138 can then compare the received sample image with a reference image (e.g., reference image 600) to determine the processing state of the workpiece 122. If the image processing module 138 determines that the processing state of the workpiece 122 is incomplete (e.g., if the received sample image signal looks like image 400), then the processing tool control module 140 may control the laser system 102 to process the workpiece 122 along the entire route illustrated in FIG. 7 for a second time. The processing state of the workpiece 122 can then be determined again by the image processing module 138 and, if the processing state of the workpiece 122 is still incomplete, the processing tool control module may control the laser system 102 to process the workpiece 122 along the entire route illustrated in FIG. 7 for a third time. This process may be repeated as many times as necessary until the processing state of the workpiece 122 can then be determined to be complete (e.g., until the received sample image looks like image 500).

Although it has been described above that the image processing module 138 determines the processing state of the workpiece 122 only after the workpiece 122 has been processed along an entire route, it will be appreciated that the image processing module 138 can determine the processing state of the workpiece 122 between one or more sub-routes of a route. For example, the processing state of the workpiece 122 can be determined at a time $t=t_x$, where $t_8<t_x<t_9$. In another example, the processing state of the workpiece 122 can be determined at any time when the beam of laser energy 114 is not being directed onto any portion of the workpiece 122 disposed in the processing region 112 (e.g., at time $t=t_y$, where $t_4<t_y<t_5$, where $t_{10}<t_y<t_{11}$, or the like). In still another example, the processing state of the workpiece 122 can be determined when the beam of laser energy 114 is being directed onto workpiece 122. As will be appreciated, an image signal could be generated by the image sensor 108 each time before the processing state is determined by the image processing module 138. In these embodiments, the image processing module 138 may determine the processing state of the workpiece 122 by comparing a received sample image with a reference image uniquely corresponding the portion(s) of the workpiece 122 that should have been processed over a period of time. Alternatively or additionally, the image processing module 138 may determine the processing state of the workpiece 122 by comparing a received sample image with a corresponding region of a complete reference image (e.g., like reference image 600). In any of these embodiments, the processing tool control module 140 may control the laser system 102 to selectively process the workpiece 122 along one or more individual sub-routes until the processing state of the workpiece 112 along the one or more individual sub-routes is determined to be complete.

Controller 110 may be an electronic circuit comprising one or more components, including digital circuitry, analog circuitry, or both. Controller 110 may be a software and/or firmware programmable type; a hardwired, dedicated state machine; or a combination of these. In one embodiment, controller 110 is of a programmable microcontroller solid-state integrated circuit type that includes a memory and one or more central processing units. Memory associated with controller 110 (if present) may be comprised of one or more components and may be of any volatile or nonvolatile type, including the solid-state variety, the optical media variety, the magnetic variety, a combination of these, or such different arrangement as would occur to those skilled in the art. Controller 110 further includes operating logic in the form of software instructions, hardware instructions, dedicated hardware, or the like that defines one or more control processes or the like that may be implemented by modules such as the aforementioned image processing module 138 and processing tool control module 140.

The foregoing is illustrative of embodiments of the invention and is not to be construed as limiting thereof. Although a few example embodiments of the invention have been described, those skilled in the art will readily appreciate that many modifications are possible in the example embodiments without materially departing from the novel teachings and advantages of the invention. For example, although embodiments of an apparatus and method for processing workpieces have been described in connection with use of an image sensor, such as image sensor 108, that detects an image of detection light 130 transmitted through the processing region, it will be appreciated that the image sensor 108 can detect other characteristics of the detection light 130. For example, the image sensor can be configured to simply detect the presence or absence of detection light 130 transmitted through the processing region 112, the intensity of detection light 130 transmitted through the processing region 112, the location where detection light 130 is transmitted through the processing region 112, or the like or a combination thereof.

In view of the foregoing, it is to be understood that the foregoing is illustrative of the invention and is not to be construed as limited to the specific example embodiments of the invention disclosed, and that modifications to the disclosed example embodiments, as well as other embodiments, are intended to be included within the scope of the appended claims. The invention is defined by the following claims, with equivalents of the claims to be included therein.

What is claimed is:

1. A method of processing a workpiece having a front side and a back side, the method comprising:
    arranging the front side of the workpiece such that a portion of the front side of the workpiece is disposed within a processing region of a processing tool;
    within the processing region, processing from the front side of the workpiece with the processing tool to remove material within the portion of the workpiece to form a workpiece feature that extends fully or partially through the workpiece;
    after forming the workpiece feature, directing detection light into the processing region and onto the portion of the front side of the workpiece, wherein the detection light has a wavelength to which the workpiece is at least partially opaque;
    detecting detection light transmitted through the processing region to the back side of the workpiece;
    comparing sample image data of the workpiece feature to reference image data of a reference feature to determine a processing state of the workpiece feature based on amount of coincidence between the sample image data of the workpiece feature and the reference image data of the reference feature, wherein the processing state of the workpiece feature is one of complete or incomplete with respect to processing by the processing tool; and
    within the processing region, further processing the workpiece feature from the front side of the workpiece with the processing tool when comparison of the sample image data and the reference image data indicates that the processing state of the workpiece feature is incomplete.

2. The method of claim 1, wherein the workpiece comprises a semiconductor wafer having a thickness of less than 50 microns.

3. The method of claim 1, wherein processing the workpiece comprises directing a beam of laser energy onto the workpiece.

4. The method of claim 3, wherein the detection light transmitted through the processing region to the back side of the workpiece provides the sample image data of the workpiece feature, wherein the sample image data of the workpiece feature include illuminated region data and non-illuminated region data, wherein the illuminated region data correspond to regions of the workpiece sufficiently processed by the processing tool to permit propagation of the detection light through the workpiece, and wherein the non-illuminated region data correspond to regions of the workpiece not processed by the processing tool and to regions of the workpiece insufficiently processed by the processing tool that preclude propagation of the detection light through the workpiece;
    wherein the reference image data of the reference feature include target illuminated region data and target non-illuminated region data, wherein the target illuminated region data correspond to regions of the workpiece that would be sufficiently processed when the workpiece feature is formed as desired, wherein the target non-illuminated region data correspond to regions of the workpiece that would not be processed when the workpiece feature is formed as desired; and
    wherein sufficient coincidence between the sample image data and the reference image data is indicative of a complete processing state, and wherein an insufficient coincidence between the sample image data and the reference image data is indicative of an incomplete processing state.

5. The method of claim 4, wherein the workpiece feature extends fully through the workpiece.

6. The method of claim 4, wherein acquiring the sample image data employs an image sensor, wherein a controller is coupled to the image sensor, wherein the image sensor is configured to generate an image signal corresponding to the sample image data, and wherein the controller is configured to determine the processing state of the workpiece feature based on the image signal.

7. The method of claim 6, wherein the controller is further coupled to the processing tool and is configured to control an operation of the processing tool based on the processing state determined by the controller, wherein the controller causes the workpiece to be iteratively processed by the processing tool until a feature is formed as desired based on successive comparisons of the sample image data.

8. The method of claim 4, wherein sufficient coincidence between the sample image data and the reference image data comprise an overlap of greater than or equal to 80%.

9. The method of claim 4, wherein multiple features are processed before comparing the sample image data to the reference image data, and wherein the sample image data and the reference image data pertain to the multiple features.

10. The method of claim 4, wherein the processing tool comprises a laser system for generating a beam of laser energy to remove material from the workpiece, wherein the laser system comprises a beam steering system to scan the beam of laser energy relative to the workpiece, wherein the workpiece includes a semiconductor wafer, wherein the feature is a scribe line, and wherein a first scan pass to form multiple scribe lines is completed prior to comparing the sample image data to the reference image data.

11. The method of claim 4, wherein both location and intensity of the detection light transmitted through the processing region to the back side of the workpiece are utilized to determine the processing state.

12. The method of claim 4, wherein the workpiece comprises a plurality of active regions including integrated circuits, semiconductor memory, or MEM devices formed on the front side of the workpiece.

13. The method of claim 3, wherein the beam of laser energy has a laser wavelength, wherein the detection light has a detection wavelength, and wherein the detection wavelength of the detection light is different from the laser wavelength of the beam of laser energy.

14. The method of claim 13, wherein the processing state is determined at a time when the beam of laser energy is turned on.

15. The method of claim 1, wherein the workpiece is supported by a chuck, and wherein the chuck is less opaque to the detection light than the workpiece is to the detection light.

16. The method of claim 1, wherein acquiring the sample image data employs an image sensor in cooperation with an optical filter disposed between the image sensor and the processing region, wherein the optical filter is configured to selectively transmit a selected portion of the detection light transmitted through the processing region, wherein the image sensor is sensitive to the selected portion of detection light selectively transmitted by the optical filter.

17. The method of claim 1, wherein the processing tool comprises a laser system for generating a beam of laser energy to remove material from the workpiece, wherein acquiring the sample data employs an image sensor, wherein a controller is coupled to the image sensor, wherein the image sensor is configured to generate an image signal corresponding to the sample image data, wherein the controller is configured to determine the processing state of the workpiece based on the image signal, and wherein the processing state is determined at a time when the beam of laser energy is turned off.

18. The method of claim 17, wherein the laser system comprises a beam steering system to scan the beam of laser energy relative to the workpiece, and wherein the controller is further coupled to the laser system and is configured to provide a laser scanning route to the laser beam steering system based on the processing state determined by the controller.

19. The method of claim 1, wherein the processing tool comprises a mechanical drill, a mechanical saw, a plasma etching system, or a chemical etching system.

20. The method of claim 1, wherein workpiece comprises at least one of a silicon (Si) wafers, silicon-on-insulator (SOI) wafers, gallium arsenide (GaAs) wafers, sapphire wafers, printed circuit boards (PCBs), flexible printed circuits (FPCs), ceramic pieces, metal pieces, metal plates, metal foils, polymers, phase change materials, chalcogenide-based phase change materials, GeSbTe, AgInSbTe, GaSb, InSb, InSbTe, (GeSn)SbTe, InSe, GaSeTe, GeSb(SeTe), SbTe, SnSbTe, TeGeSbS, GeTe, InSbGe, or a combination thereof.

21. The method of claim 1, wherein the workpiece feature comprises at least one of a via, a hole, a bore, a slot, a scribe line, or a fiducial marker.

22. The method of claim 1, wherein the processing state is determined based on a percentage of overlap between the sample image data of the workpiece feature and the reference image data of the reference feature.

* * * * *